(12) United States Patent
Norrell et al.

(10) Patent No.: US 7,061,857 B2
(45) Date of Patent: Jun. 13, 2006

(54) SYSTEM AND METHOD FOR FAULT ISOLATION FOR DSL LOOP EXTENDERS

(75) Inventors: Andrew L. Norrell, Nevada City, CA (US); James T. Schley-May, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 755 days.

(21) Appl. No.: 10/077,308

(22) Filed: Feb. 15, 2002

(65) Prior Publication Data

US 2002/0110221 A1 Aug. 15, 2002

Related U.S. Application Data

(60) Provisional application No. 60/269,218, filed on Feb. 15, 2001.

(51) Int. Cl.
 *H04J 1/16* (2006.01)
(52) U.S. Cl. .................................... 370/216
(58) Field of Classification Search ............... 370/241, 370/252, 254, 222, 407, 408, 216, 480; 379/27, 379/24, 30, 32
 See application file for complete search history.

(56) References Cited

U.S. PATENT DOCUMENTS

| 761,995 A | 6/1904 | Pupin |
|---|---|---|
| 1,711,653 A | 5/1929 | Quartes |
| 3,180,938 A | 4/1965 | Glomb |
| 3,476,883 A | 11/1969 | Birck |
| 3,548,120 A | 12/1970 | Tarassoff |
| 3,578,914 A | 5/1971 | Simonelli |
| 3,848,098 A | 11/1974 | Pinel |
| 3,873,936 A | 3/1975 | Cho |
| 3,944,723 A | 3/1976 | Fong |
| 3,962,549 A | 6/1976 | Zuk |
| 4,025,737 A | 5/1977 | Brewer |
| 4,131,859 A | 12/1978 | Valle |
| 4,139,745 A * | 2/1979 | Ashdown et al. ............. 379/24 |
| 4,242,542 A | 12/1980 | Kimbrough |
| 4,259,642 A | 3/1981 | Derby |
| 4,277,655 A | 7/1981 | Surprenant |
| 4,392,225 A | 7/1983 | Wortman |
| 4,462,105 A | 7/1984 | Wagner et al. |
| 4,583,220 A | 4/1986 | Blackburn et al. |
| 4,633,459 A | 12/1986 | Blackburn |

(Continued)

OTHER PUBLICATIONS

Nilsson, J.W., and Riedel, S.A., "Electric Circuits", 1996, pp. 723-777, Fifth Edition, Addison-Wesley, Reading, MA.

(Continued)

*Primary Examiner*—Dang Ton
(74) *Attorney, Agent, or Firm*—Blakely, Sokoloff, Taylor & Zafman LLP

(57) ABSTRACT

A system and method are disclosed to implement fault detection in DSL loop extenders. The system of the invention includes a plurality of loop extenders coupled to a local loop, a loop extender (LE) test box coupled to the local loop, and fault detection circuitry coupled to each of the plurality of loop extenders. The LE test box sends a tone pair associated with a loop extender over the local loop, the loop extender associated with the tone pair processes the tone pair to generate a response tone and sends the response tone to the LE test box via the local loop. Then, the LE test box determines functionality of the loop extender based upon the received response tone.

48 Claims, 6 Drawing Sheets

U.S. PATENT DOCUMENTS

| | | |
|---|---|---|
| 4,656,628 A | 4/1987 | Tan |
| 4,667,319 A | 5/1987 | Chum |
| 4,766,606 A | 8/1988 | Bardutz et al. |
| 4,768,188 A | 8/1988 | Barnhart et al. |
| 4,788,657 A | 11/1988 | Douglas et al. |
| 4,970,722 A | 11/1990 | Preschutti |
| 5,049,832 A | 9/1991 | Cavers |
| 5,095,528 A | 3/1992 | Leslie et al. |
| 5,133,081 A * | 7/1992 | Mayo .......................... 455/18 |
| 5,181,198 A | 1/1993 | Lechleider |
| 5,394,401 A | 2/1995 | Patrick et al. |
| 5,422,929 A | 6/1995 | Hurst et al. |
| 5,455,538 A | 10/1995 | Kobayashi et al. |
| 5,526,343 A | 6/1996 | Aizawa et al. |
| 5,623,485 A | 4/1997 | Bi |
| 5,678,198 A | 10/1997 | Lemson |
| 5,724,344 A | 3/1998 | Beck |
| 5,726,980 A | 3/1998 | Rickard |
| 5,736,949 A | 4/1998 | Ong et al. |
| 5,765,097 A | 6/1998 | Dail |
| 5,790,174 A | 8/1998 | Richard, III et al. |
| 5,822,325 A | 10/1998 | Segaram et al. |
| 5,825,819 A | 10/1998 | Cogburn |
| 5,859,895 A | 1/1999 | Pomp et al. |
| 5,892,756 A | 4/1999 | Murphy |
| 5,909,445 A | 6/1999 | Schneider |
| 5,912,895 A | 6/1999 | Terry et al. |
| 5,929,402 A | 7/1999 | Charles et al. |
| 5,974,137 A | 10/1999 | Sheets et al. |
| 5,991,311 A | 11/1999 | Long et al. |
| 6,005,873 A | 12/1999 | Amit |
| 6,029,048 A | 2/2000 | Treatch |
| 6,032,019 A * | 2/2000 | Chen et al. .................. 725/124 |
| 6,047,222 A | 4/2000 | Burns et al. |
| 6,058,162 A | 5/2000 | Nelson et al. |
| 6,084,931 A | 7/2000 | Powell, II et al. |
| 6,091,713 A | 7/2000 | Lechleider et al. |
| 6,091,722 A | 7/2000 | Russell et al. |
| 6,128,300 A | 10/2000 | Horton |
| 6,154,524 A | 11/2000 | Bremer |
| 6,188,669 B1 | 2/2001 | Bellenger |
| 6,195,414 B1 | 2/2001 | Simmons et al. |
| 6,208,670 B1 | 3/2001 | Milliron et al. |
| 6,226,322 B1 | 5/2001 | Mukherjee |
| 6,226,331 B1 | 5/2001 | Gambuzza |
| 6,236,664 B1 | 5/2001 | Erreygers |
| 6,236,714 B1 | 5/2001 | Zheng et al. |
| 6,246,695 B1 | 6/2001 | Seazholtz et al. |
| 6,262,972 B1 | 7/2001 | McGinn et al. |
| 6,263,047 B1 | 7/2001 | Randle et al. |
| 6,266,348 B1 | 7/2001 | Gross et al. |
| 6,266,395 B1 | 7/2001 | Liu et al. |
| 6,278,769 B1 | 8/2001 | Bella |
| 6,281,454 B1 | 8/2001 | Charles et al. |
| 6,301,337 B1 | 10/2001 | Scholtz et al. |
| 6,343,114 B1 | 1/2002 | Chea, Jr. |
| 6,345,071 B1 | 2/2002 | Hamdi |
| 6,345,072 B1 | 2/2002 | Liu et al. |
| 6,370,188 B1 | 4/2002 | Wu et al. |
| 6,385,234 B1 | 5/2002 | Ashley |
| 6,385,252 B1 | 5/2002 | Gradl et al. |
| 6,385,253 B1 | 5/2002 | Swisher |
| 6,466,656 B1 | 10/2002 | Evans et al. |
| 6,477,178 B1 * | 11/2002 | Wakim et al. ............... 370/466 |
| 6,507,606 B1 | 1/2003 | Shenoi et al. |
| 6,532,279 B1 | 3/2003 | Goodman |
| 6,546,100 B1 | 4/2003 | Drew |
| 6,658,049 B1 | 12/2003 | McGhee et al. |
| 6,681,012 B1 | 1/2004 | Gorcea et al. |
| 6,751,315 B1 | 6/2004 | Liu et al. |
| 6,829,292 B1 | 12/2004 | Shenoi |
| 2002/0001340 A1 | 1/2002 | Shenoi et al. |
| 2002/0061058 A1 | 5/2002 | Sommer |
| 2002/0090026 A1 | 7/2002 | Ashley |
| 2002/0105964 A1 | 8/2002 | Sommer et al. |
| 2002/0106012 A1 | 8/2002 | Norrell et al. |
| 2002/0106013 A1 | 8/2002 | Norrell et al. |
| 2002/0106076 A1 | 8/2002 | Norrel et al. |
| 2002/0113649 A1 | 8/2002 | Tambe et al. |
| 2002/0141569 A1 | 10/2002 | Norrell et al. |
| 2003/0051060 A1 | 3/2003 | Vitenberg |

OTHER PUBLICATIONS

Starr, Thomas, et al., "Understanding Digital Subscriber Line Technology, "Prentice Hall PTR, Upper Saddle River, NJ, 07458, 1999, ISBN 0137805454.

Chen, Walter Y., "DSL Simulation Techniques and Standards Development for Digital Subscriber Line Systems", Macmillan Technical Publishing, Indianapolis, Indiana, ISBN 1578700175.

"Smart Coil™—The line conditioner for the digital age! Smart Coils condition copper pairs for deployment of both ADSL (data) and toll-quality voice services on the same line", Charles a registered Trademark of Charles Industries, LTD., 2 pages.

"Testing Inter-Winding Capacitance", Rhombus Industries, Inc., Huntington Beach, California, 1997, 1 page.

"Transformer General Parameters for Telecom Magnetic Component", Delta Products Corporation, Fremont, California, 1 page.

"Design Idea DI-61 TinySwitch® -II 3 W Charger: <200 mW No-Load Consumption", Power® Integrations, www.powerint.com, Mar. 2004, 2 pages.

"Lundahl Transformers, Tube amplifier transformers, OPTs, mains, and interstage transformers", http://www.lundahl.se/tubes.html, Apr. 13, 2004, pp. 1-7.

"TechEncyclopedia", TechWeb, http://www.techweb.com/encyclopedia/defineterm?term=dsl&x=20&y=5, Apr. 16, 2004, pp. 1-4.

Grossner, Nathan R., "The Wide-Band Transformer: Synthesis", and "The Pulse Transformer: Analysis", Transformers for Electronic Circuits, Copyright © 1967, by McGraw-Hill, pp. 225-252.

US 6,351,496, 02/2002, Tarraf (withdrawn)

* cited by examiner

| Loop Extender | Low Tone, KHz | High Tone, KHz | Response Tone, KHz |
|---|---|---|---|
| 204 | 480 | 540  410 | 60 |
| 206 | 380 | 430  420 | 50 |
| 208 | 300 | 340  430 | 40 |
| 210 | 240 | 270  440 | 30 |

FIG. 4

SYSTEM AND METHOD FOR FAULT ISOLATION FOR DSL LOOP EXTENDERS

CROSS-REFERENCE TO RELATED APPLICATIONS

This application is related to, and claims the benefit of, U.S. Provisional Patent Application No. 60/269,218, filed on Feb. 15, 2001 and entitled "System and Method for Fault Isolation for DSL Repeaters." This application also relates to commonly assigned U.S. patent application Ser. No. 09/569,470, filed on May 12, 2000 and entitled "DSL Repeater," U.S. patent application Ser. No. 09/610,788, filed on Jul. 6, 2000, now abandoned, and entitled "DSP-Based Repeater for DSL Signals," U.S. patent application Ser. No. 09/670,475, filed on Sep. 26, 2000 and entitled "Load Coil And DSL Repeater Including Same," U.S. patent application Ser. No. 10/072,833 filed on Feb. 6, 2002 and entitled "Loop Extender with Selectable Line Termination and Equalization," U.S. patent application Ser. No. 10/072,091 filed on Feb. 6, 2002 and entitled "Loop Extender with Communications, Control, and Diagnostics," and U.S. patent application Ser. No. 10/071,980 filed on Feb. 6, 2002 and entitled "Line Powered Loop Extender with Communications, Control, and Diagnostics." The disclosures of these related applications are hereby incorporated by reference.

BACKGROUND OF THE INVENTION

1. Field of the Invention

This invention relates generally to digital subscriber line (DSL) systems and relates more particularly to a system and method for fault isolation for DSL loop extenders.

2. Description of the Background Art

DSL loop extender technology can be used to increase DSL data rates for subscribers that are located well beyond the normal service limit for DSL, normally about 18,000 feet. Loop extenders can be installed at certain points along a subscriber loop to facilitate multi-mega bit DSL service at 30,000 feet or more. For best results, one or more loop extenders are installed along a long loop.

It is generally desirable that loop extenders be highly reliable and that malfunctioning devices be simply, quickly, and accurately identified. Indeed, it is desirable for loop extender diagnostic systems and methods to provide quick and accurate diagnostic results with low cost.

Hence, a need exits for diagnostic equipment and methodology with low complexity and high effectiveness. It is undesirable to add significant complex diagnostic circuitry into the loop extenders that may itself have a high likelihood of failure. It is also undesirable to include diagnostic procedures that are difficult to administer, produce ambiguous results, or that do not adequately test the equipment in question.

A further need exits for loop extender diagnostic procedures that may be administered completely from a central office, require little training, use equipment that is familiar to telephone company technicians, test a large portion of the circuitry of the device under test, accurately locate the malfunctioning device, and take little time.

SUMMARY OF THE INVENTION

In accordance with the present invention, a system and method are disclosed to implement fault detection in DSL loop extenders. The system of the invention includes a plurality of loop extenders coupled to a local loop, a loop extender (LE) test box coupled to the local loop, and fault detection circuitry coupled to each of the plurality of loop extenders.

The LE test box generates tone pairs, sends downstream DSL signals and the tone pairs over the local loop, receives upstream DSL signals and response tones from the local loop, and determines operational functionality of each of the plurality of loop extenders based upon the received response tones.

The fault detection circuitry coupled to each of the plurality of loop extenders receives the tone pairs and generates the response tones, where each response tone is associated with one of the plurality of loop extenders.

In one embodiment of the invention, each tone pair is associated with each of the plurality of loop extenders, and each tone pair includes a high tone at a high tone frequency and a low tone at a low tone frequency. In addition, each response tone has a response tone frequency equal to a difference between the high tone frequency and the low tone frequency.

The LE test box sends a tone pair associated with a loop extender over the local loop, the loop extender associated with the tone pair processes the tone pair to generate a response tone and sends the response tone to the LE test box via the local loop. If the LE test box detects the response tone for a predetermined response time period, then the loop extender is determined to be operational, however, if the LE test box does not detect the response tone for the predetermined response time period, then the loop extender is determined to be faulty.

In one embodiment of the invention, the fault detection circuitry for one of the plurality of loop extenders includes a first bandpass filter coupled to a downstream path of the loop extender for passing the low tone and the high tone of the tone pair associated with the loop extender and attenuating signals outside of the tone pair frequency band, a mixer coupled to the first bandpass filter for modulating the high tone with the low tone to generate a difference tone at a difference tone frequency equal to the high tone frequency minus the low tone frequency, a second bandpass filter coupled to the mixer for passing the difference tone, a detector/sequencer coupled to the second bandpass filter for detecting the difference tone and generating a control signal, and a tone generator coupled to the detector/sequencer and coupled to an upstream path of the loop extender for generating a response tone associated with the loop extender upon reception of the control signal.

BRIEF DESCRIPTION OF THE DRAWINGS

FIG. 4 is a table showing one embodiment of frequency values for pairs of test tones and response tones of the DSL system of FIG. 2, in accordance with the invention;

DETAILED DESCRIPTION OF THE DRAWINGS

Figure 1:
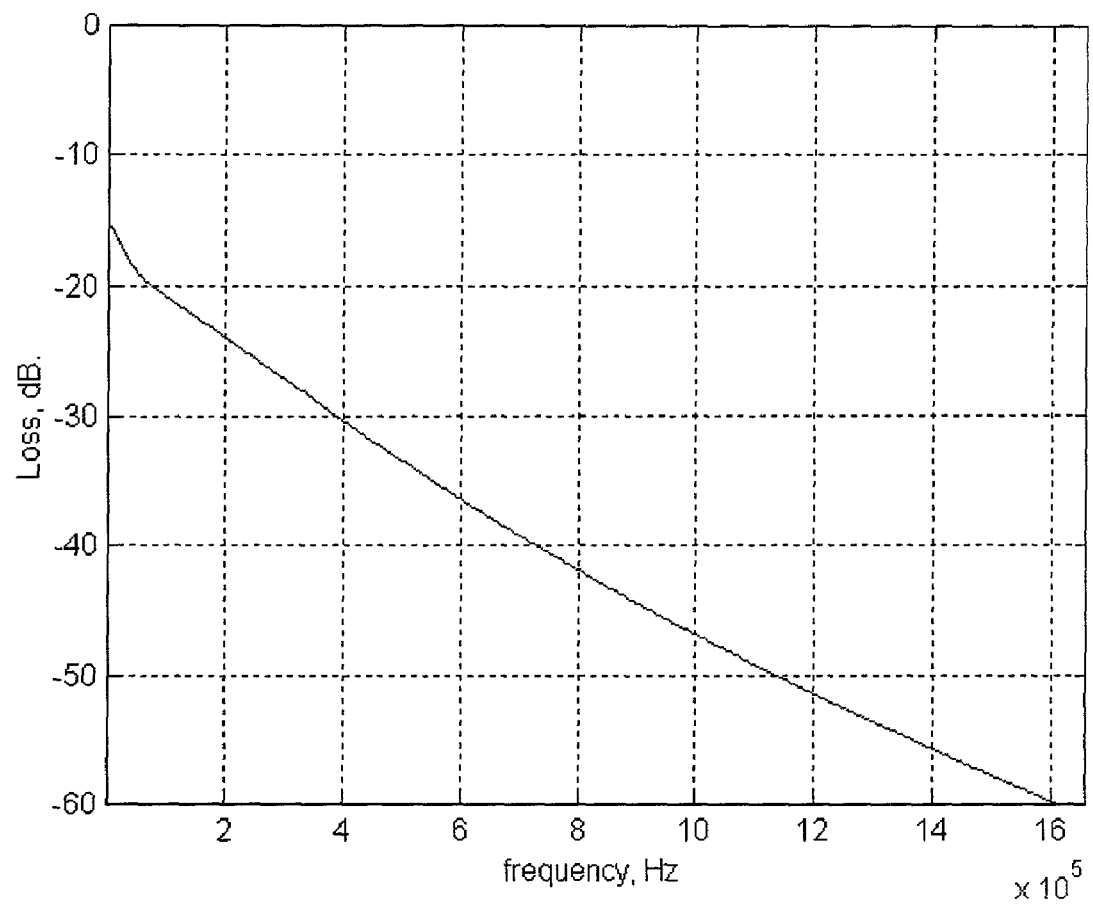
FIG. 1 illustrates an example of the attenuation of a DSL signal over 6,000 feet of 26 AWG (American Wire Gauge) telephone cable.

FIG. 1 illustrates an example of the attenuation of a DSL signal over 6,000 feet of 26 AWG (American Wire Gauge) telephone cable. As shown, higher frequency signals are generally attenuated more than lower frequency signals. In the FIG. 1 example, a 250 KHz signal is attenuated by about 25 dB over 6,000 feet of 26 AWG telephone cable while a 1 MHz signal is attenuated by about 46 dB over 6,000 feet of 26 AWG telephone cable. As those skilled in the art will appreciate, the actual degree of attenuation will also depend on factors in addition to loop length, such as temperature.

Figure 2:
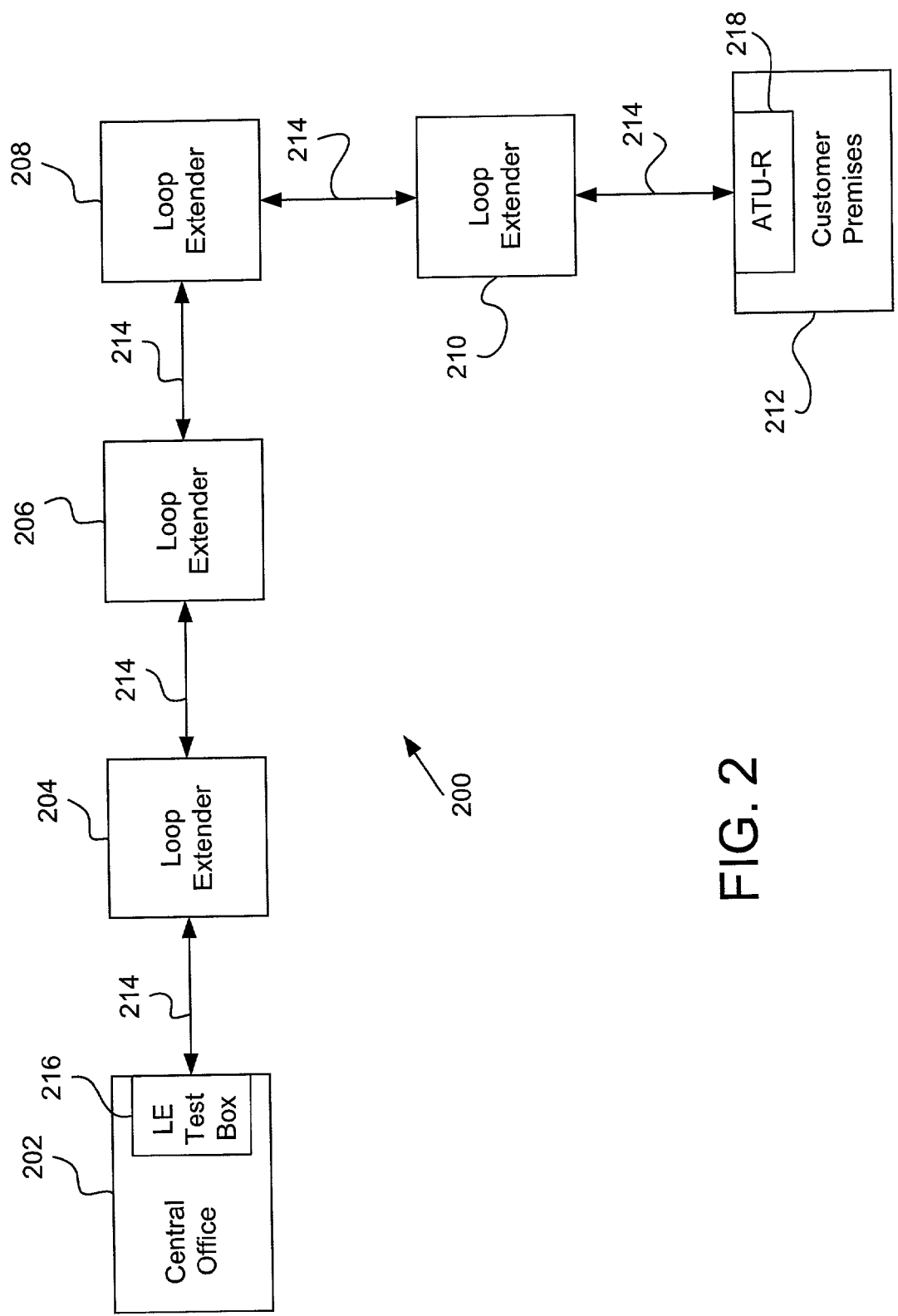
FIG. 2 is a block diagram of one embodiment of a digital subscriber line (DSL) system including loop extenders, in accordance with the invention.

FIG. 2 is a block diagram of one embodiment of a DSL system 200 including a central office 202, loop extenders 204, 206, 208, and 210, and a customer premises 212. Customer premises 212 is coupled to central office 202 by a local loop 214. Local loop 214 comprises a twisted pair of copper wires commonly know in the art as a "twisted pair." Typically, the copper wires are formed of 22, 24, or 26 AWG wire.

Central office 202 includes a loop extender (LE) test box 216 coupled to local loop 214 for providing loop extender fault diagnostic functionality to DSL system 200. Central office 202 also includes an ADSL Termination Unit—Central Office (ATU-C, not shown) coupled to local loop 214 for transmitting and receiving DSL signals over local loop 214. In another embodiment, the functionality of LE test box 216 is implemented as a diagnostic mode of the ATU-C. Customer premises 212 includes an ADSL Termination Unit—Remote (ATU-R) 218 coupled to local loop 214 for transmitting and receiving DSL signals over local loop 214.

Loop extenders 204, 206, 208, and 210, also called DSL repeaters, are coupled to local loop 214 to amplify DSL signals, such as ADSL or VDSL signals, passing over local loop 214 between central office 202 and customer premises 212. As discussed above, DSL signals are generally attenuated as they travel along a local loop, such as local loop 214. Loop extenders 204, 206, 208, 210 are disposed along local loop 214 between central office 202 and customer premises 212 to at least partially compensate for the DSL signal attenuation by amplifying the transmitted DSL signals. Additional details of loop extender 204 are described below in conjunction with FIG. 3.

Further, FIG. 2 illustrates that loop extenders 204, 206, 208, and 210 are coupled in series, or in cascaded fashion, to local loop 214 for amplifying transmitted DSL signals multiple times and in multiple locations between customer premises 212 and central office 202 to permit DSL signals to be transmitted over greater distances while still maintaining an acceptable DSL signal amplitude. Pursuant to this configuration, loop extender 204 amplifies a downstream signal to at least partially compensate for the attenuation incurred as the downstream signal passes over the portion of local loop 214 between central office 202 and loop extender 204. Next, loop extender 206 amplifies the downstream signal to at least partially compensate for the attenuation incurred as the downstream signal passes over the portion of local loop 214 between loop extender 204 and loop extender 206. Then, loop extender 208 amplifies the downstream signal to at least partially compensate for the attenuation incurred as the downstream signal passes from loop extender 206 to loop extender 208. Finally, loop extender 210 amplifies the downstream signal to at least partially compensate for the attenuation incurred as the downstream signal passes from loop extender 208 to loop extender 210.

Likewise, for upstream DSL signals from customer premises 212 to central office 202, loop extenders 204, 206, 208, and 210 amplify the upstream signals to at least partially compensate for the attenuation that occurs between customer premises 212 and loop extender 204.

According to one embodiment, loop distance between each pair of loop extenders (204 and 206, 206 and 208, 208 and 210) is between about 5,000 and 7,000 feet. In a preferred embodiment, the loop distance between each pair of loop extenders (204 and 206, 206 and 208, 208 and 210) is about 6,000 feet. This loop distance between multiple loop extenders disposed in series, in cascaded fashion, along a single local loop may be advantageous in that each loop extender may be adapted with POTS loading coils. These embodiments may then replace conventional POTS loading coils, which are disposed about every 6,000 feet along a local loop to provide both POTS loading and DSL signal amplification functionality.

Local loop 214 is illustrated as having four cascaded loop extenders 204, 206, 208, and 210 coupled thereto between central office 202 and customer premises 212. It should be noted, however, that any number of loop extenders may be disposed in series between central office 202 and customer premises 212. For example, additional loop extenders may be disposed in series between central office 202 and customer premises 212 so that DSL signals may be effectively transmitted over an even longer local loop 214 by being amplified multiple times by multiple loop extenders.

If one or more loop extenders 204, 206, 208, and 210 fail, then a DSL service provider providing DSL service over local loop 214 may receive a service call from one or more affected subscribers. A service provider technician or a phone company technician may then identify the faulty or malfunctioning loop extender using the system and method of fault detection in accordance with the invention. Once the malfunctioning loop extender has been identified in a quick, inexpensive, and efficient manner according to the invention, a technician may be dispatched to the location of the malfunctioning loop extender to repair or replace the device.

In one embodiment LE test box 216 is configured to generate and send pairs of tones to loop extenders 204, 206, 208, and 210 over local loop 214. Each pair of tones is associated with one loop extender of loop extenders 204, 206, 208, and 210.

For example, loop extender 204 is configured to receive and process a first pair of tones for generating a first response tone. Loop extender 204 then sends the first response tone to LE test box 216 for detection via local loop 214. If LE test box 216 detects the first response tone for a predetermined response tone period, then loop extender 204 is judged operational. However, if LE test box 216 does not detect the first response tone for the predetermined response tone period, then loop extender 204 is judged faulty and may need to be repaired or replaced. In this embodiment of the invention, each loop extender is configured to receive and process a unique pair of tones for generating a unique response tone. In another embodiment of the invention, each loop extender is configured to receive and process an identical pair of tones, however, each loop extender, upon processing the pair of tones, generates a unique response tone. More details for providing loop extender fault diagnostic functionality to DSL system 200 will be discussed further below in conjunction with FIG. 3.

Figure 3:
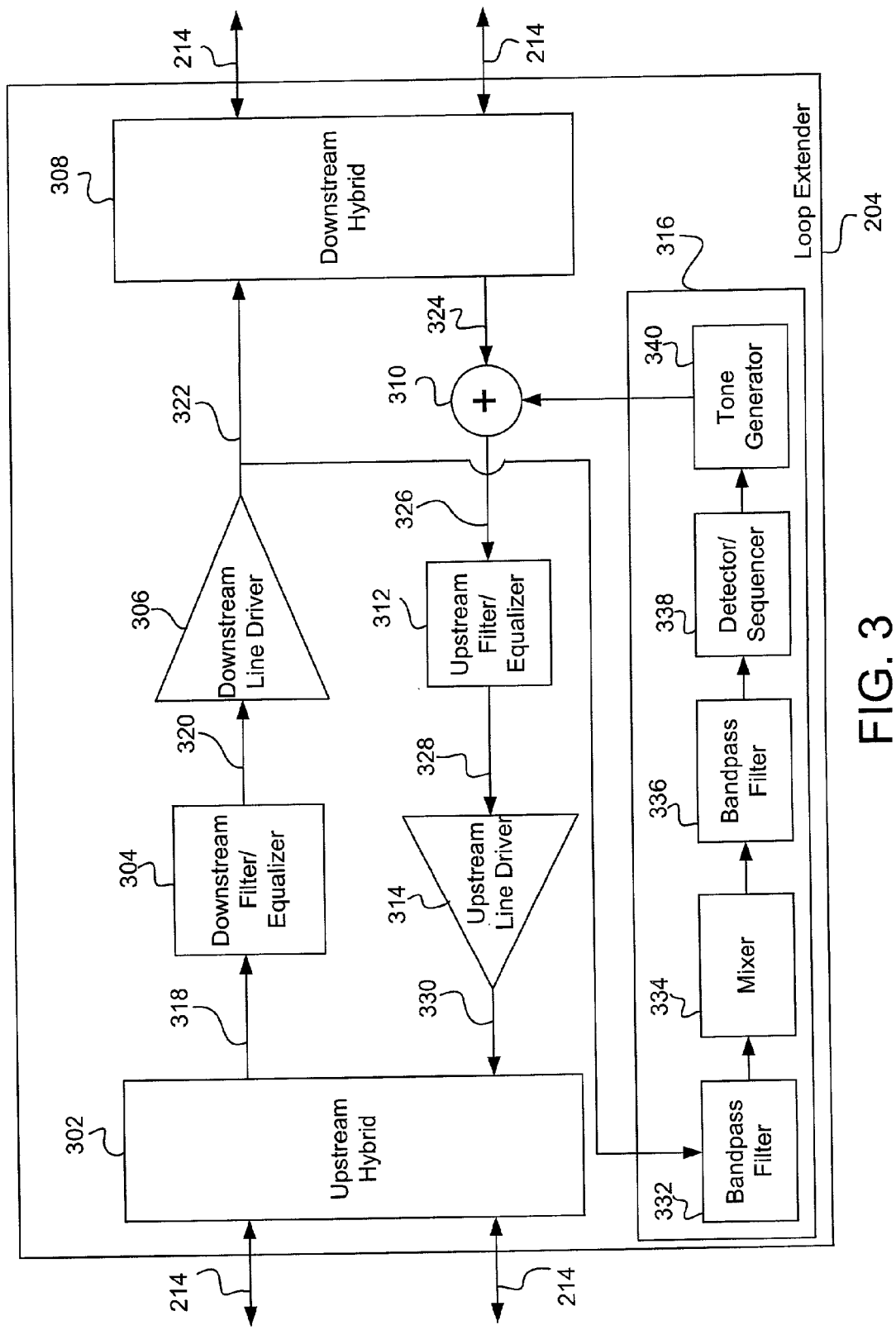
FIG. 3 is a block diagram of one embodiment of a loop extender of FIG. 2 with fault detection circuitry, in accordance with the invention.

FIG. 3 illustrates details of one embodiment of loop extender 204 of FIG. 2. Although loop extender 204 is described, the following description applies to each of loop extenders 204, 206, 208, and 210. Loop extender 204 includes an upstream hybrid 302, a downstream filter/equalizer 304, a downstream line driver 306, a downstream hybrid 308, an adder 310, an upstream filter/equalizer 312, an upstream line driver 314, and fault detection circuitry 316 for processing tone pairs and generating response tones.

In addition, loop extender 204 of FIG. 3 includes a line 318 for coupling upstream hybrid 302 with downstream filter/equalizer 304, a line 320 for coupling downstream filter/equalizer 304 with downstream line driver 306, a line 322 for coupling downstream line driver 306 and fault detection circuitry 316 with downstream hybrid 308, a line 324 for coupling downstream hybrid 308 with adder 310, a line 326 for coupling adder 310 with upstream filter/equalizer 312, a line 328 for coupling upstream filter/equalizer 312 with upstream line driver 314, and a line 330 for coupling upstream line driver 314 with upstream hybrid 302. Line 318, downstream filter/equalizer 304, line 320, downstream line driver 306, and line 322 are collectively referred to as a downstream path of loop extender 204, and line 324, adder 310, line 326, upstream filter/equalizer 312, line 328, upstream line driver 314, and line 330 are collectively referred to as an upstream path of loop extender 204.

In general, upstream hybrid 302 receives downstream DSL signals from central office 202 along local loop 214 and outputs the downstream DSL signals to downstream filter/equalizer 304 along line 318. Upstream hybrid 302 also receives amplified upstream DSL signals from upstream line driver 314 along line 330 and outputs the upstream DSL signals onto local loop 214 for transmission to central office 202.

Similarly, downstream hybrid 308 receives upstream DSL signals from customer premises 212 along local loop 214 and outputs the upstream DSL signals to adder 310 along line 324. Downstream hybrid 308 also receives amplified downstream DSL signals from downstream line driver 306 along line 322 and outputs the downstream DSL signals onto local loop 214 for transmission to customer premises 212.

As those skilled in the art will appreciate, where upstream hybrid 302 is imperfect, at least a portion of the upstream amplified DSL signal received via line 330 will leak through upstream hybrid 302 onto line 318. Likewise, where downstream hybrid 308 is imperfect, at least a portion of the downstream amplified DSL signal received via line 322 will leak through downstream hybrid 308 onto line 324. Without the filtering functionality of downstream filter/equalizer 304 and upstream filter/equalizer 312, this DSL signal leakage could cause a phenomenon known in the art as "singing"—that is oscillations caused by introducing gain into a bi-directional system due to signal leakage.

The signal leakage problem is overcome, or substantially alleviated, through the use of signal filtering via downstream filter/equalizer 304 and upstream filter/equalizer 312. In one version of Category 1 ADSL, ADSL upstream signals generally occupy the frequency spectrum between about 25–120 KHz and ADSL downstream signals generally occupy the frequency spectrum between about 150 KHz–1.104 MHz. Downstream filter/equalizer 304 substantially prevents leaked upstream signals from being transmitted back to customer premises 212 by significantly attenuating signals between 25 KHz and 120 KHz for ADSL. Likewise, upstream filter/equalizer 312 is configured to provide significant attenuation to signals between about 150 KHz–1.104 MHz for ADSL. For other varieties of DSL, such as VDSL, downstream filter/equalizer 304 and upstream filter/equalizer 312 respectively attenuate signals outside the downstream and upstream frequency bands, although the limits of these bands may be different than those for the ADSL variety.

Loop extender 204 receives upstream DSL signals from customer premises 212 via downstream hybrid 308 and sends the received upstream DSL signal to upstream filter/equalizer 312 via adder 310. Upstream filter/equalizer 312 filters out signals in the downstream frequency band, amplifies the filtered upstream DSL signal, and passes the amplified upstream DSL signal to upstream line driver 314. Upstream line driver 314 then passes the amplified upstream DSL signal to upstream hybrid 302 for transmission to central office 202 via local loop 214. Upstream line driver 314 and downstream line driver 306 may include a combination of complex impedance loads, inverting buffers, and non-inverting buffers. Further details regarding functionality and operational characteristics of upstream line driver 314, downstream line driver 306, and loop extender 204 are disclosed in U.S. patent application Ser. No. 10/072,833 filed on Feb. 6, 2002 and entitled "Loop Extender with Selectable Line Termination and Equalization."

Similarly, loop extender 204 receives downstream DSL signals from central office 202 via upstream hybrid 302 and sends the received downstream DSL signals to downstream filter/equalizer 304 via line 318. Downstream filter/equalizer 304 filters out signals in the upstream frequency band, amplifies the filtered downstream DSL signal, and passes the amplified downstream DSL signal to downstream line driver 306. Downstream line driver 306 then passes the amplified downstream DSL signal to downstream hybrid 308 for transmission to loop extender 206 via local loop 214.

Fault detection circuitry 316 of FIG. 3 includes a first bandpass filter 332, a mixer 334, a second bandpass filter 336, a detector/sequencer 338, and a tone generator 340. First bandpass filter 332 is coupled to the downstream path of loop extender 204 for receiving downstream signals including downstream DSL signals and tone pairs and filtering the downstream signals, and tone generator 340 is coupled to the upstream path of loop extender 204 via adder 310 for generating response tones based on the received tone pairs and sending the response tones to LE test box 216 via local loop 214. Fault detection circuitry 316 is discussed further below in conjunction with FIGS. 5–6.

According to one embodiment, upon receipt of a service call from one or more affected DSL subscribers, a service technician or a computer program instructs LE test box 216 to generate and send a pair of tones in a frequency range of about 200 KHz–1.104 MHz. The frequency range of the pair of tones is located within the ADSL downstream signal frequency band of about 150 KHz–1.104 MHz. In one embodiment of the invention, a unique pair of tones is associated with each loop extender 204, 206, 208, and 210 coupled to local loop 214.

FIG. 4 illustrates one embodiment of the tone pairs and response tones associated with loop extenders 204, 206, 208, and 210 of FIG. 2. According to the FIG. 4 embodiment, loop extender 204 is associated with a first tone pair 410 including a first low tone at 480 KHz and a first high tone at 540 KHz, and a first response tone at 60 KHz; loop extender 206 is associated with a second tone pair 420 including a second low tone at 380 KHz and a second high tone at 430 KHz, and a second response tone at 50 KHz; loop extender 208 is associated with a third tone pair 430 including a third low tone at 300 KHz and a third high tone at 340 KHz, and a third response tone at 40 KHz; and loop extender 210 is associated with a fourth tone pair 440 including a fourth low tone at 240 KHz and a fourth high tone at 270 KHz, and a fourth response tone at 30 KHz.

Each response tone associated with a high tone and a low tone of a tone pair is at a frequency defined by the difference between the associated high tone frequency and the associated low tone frequency. For example, the 60 KHz frequency of the first response tone is defined by the difference between the 540 KHz frequency of the first high tone and the 480 KHz frequency of the first low tone.

Figure 5:
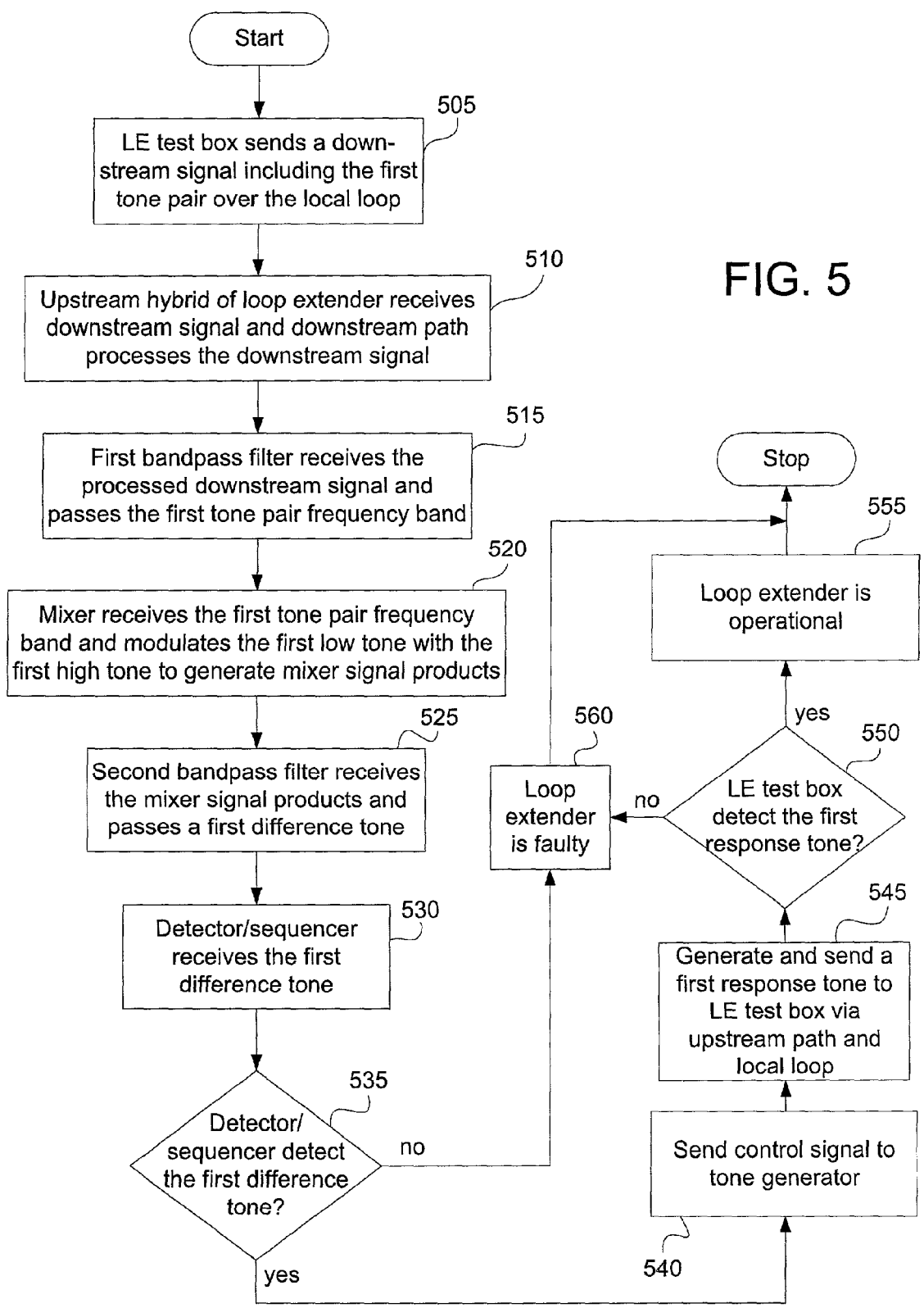
FIG. 5 is a flowchart of method steps for fault detection in the loop extender of FIG. 3, in accordance with one embodiment of the present invention.

FIG. 5 is a flowchart of method steps for fault detection in loop extender 204, according to one embodiment of the invention. However, the scope of the invention covers fault detection for any loop extender associated with any tone pair and any response tone. In step 505, LE test box 216 sends the first low tone signal at 480 KHz and the first high tone signal at 540 KHz associated with first tone pair 410 over local loop 214. Downstream DSL signals may or may not be present on local loop 214 when LE test box 216 sends first tone pair 410. For the purposes of the following discussion, first tone pair 410 and downstream DSL signals are collectively referred to as a downstream signal, and the first response signal and upstream DSL signals are collectively referred to as an upstream signal, although downstream and upstream DSL signals may or may not be present on local loop 214.

In step 510, upstream hybrid 302 receives the downstream signal and passes the downstream signal to the downstream path for processing. For example, downstream filter/equalizer 304 receives the downstream signal via line 318 and filters out the upstream frequency components from the downstream signal, amplifies the downstream signal, and passes the amplified downstream signal to downstream line driver 306. Downstream line driver 306 passes the downstream signal to downstream hybrid 308 and first bandpass filter 332.

In step 515, first bandpass filter 332 receives the downstream signal and is configured to pass signal frequency components within a first low tone-first high tone frequency band (480–540 KHz frequency band) and attenuate signal frequency components outside of the 480–540 KHz frequency band. That is, first bandpass filter 332 passes first tone pair 410 to mixer 334, but attenuates second tone pair 420, third tone pair 430, and fourth tone pair 440.

In step 520, mixer 334 modulates the first low tone at 480 KHz with the first high tone at 540 KHz, generating a tone at a difference frequency (beat frequency) of the first low tone and first high tone, another tone at a summed frequency of the first low tone and the first high tone, as well as other harmonics and spurious tones at a variety of frequencies. The difference tone at 60 KHz, the summed tone at 1.020 MHz, and the other harmonics and spurious tones are collectively referred to as mixer signal products.

In step 525, second bandpass filter 336 receives the mixer signal products and is configured to pass the difference tone at 60 KHz to detector/sequencer 338 and attenuate the other mixer signal products. In step 530, detector/sequencer 338 receives the difference tone. Detector/sequencer 338 is configured to detect the difference tone at a level that exceeds a predetermined difference tone threshold level. In one embodiment of the invention, the predetermined difference tone threshold level is a tone energy level.

In step 535, if detector/sequencer 338 detects the difference tone at a level that exceeds the predetermined difference tone threshold level for a predetermined difference tone time period, then in step 540, detector/sequencer 338 waits until the level of difference tone falls below the predetermined difference tone threshold level and then sends a control signal to tone generator 340. The predetermined difference tone time period may be a time period selected from a 10–60 second range, for example.

In step 545, tone generator 340, upon receiving the control signal, generates a first response tone at 60 KHz and sends the first response tone to adder 310. Typically, tone generator 340 generates a 10–60 second long first response tone, and then tone generator 340 automatically shuts-off. Adder 310 combines the first response tone received from tone generator 340 with any upstream DSL signals received from downstream hybrid 308 and sends the combined signal (upstream signal) to LE test box 216 via the upstream path and local loop 214.

In step 550, LE test box 216 receives the upstream signal and is configured to detect the first, second, third, and fourth response tones when the first, second, third, and fourth response tones exceed predetermined response tone threshold levels. If LE test box 216 detects the first response tone for a predetermined response tone time period, then in step 555, loop extender 204 is determined to be operational. However, in step 550, if LE test box 216 does not detect the first response tone for the predetermined response tone time period, then in step 560, loop extender 204 is determined to be faulty.

Referring again to step 535, if detector/sequencer 338 does not detect the difference tone at a level that exceeds the predetermined difference tone threshold level for a predetermined difference tone time period, then in step 560, loop extender 204 is determined to be faulty.

The method steps for fault detection of FIG. 5 may be repeated for each of the remaining loop extenders 206, 208, and 210. The fault detection circuitry of each loop extender is configured to process and respond to only the tone pair associated with the loop extender. For example, LE test box 216 sends second tone pair 420 over local loop 214. The fault detection circuitry (not shown) of loop extender 206 may receive and process the second tone pair. If loop extender 206 does receive and process the second tone pair, then loop extender 206 generates and sends a second response tone at 50 KKHz to LE test box 216 via local loop 214. If LE test box 216 detects the second response tone for a predetermined response tone time period, then loop extender 206 is determined to be operational. However, if LE test box 216 does not detect the second response tone for the predetermined response tone time period, then loop extender 206 is determined to be faulty.

For example, if the downstream path of loop extender 206 is faulty, then the fault detection circuitry of loop extender 206 may not be able to generate the second response tone, or if the downstream path of loop extender 206 is operational but the upstream path is faulty, then the fault detection circuitry of loop extender 206 may generate and send the second response tone to LE test box 216, but the second response tone received by LE test box 216 may be undetectable for the predetermined response tone time period.

Figure 6:
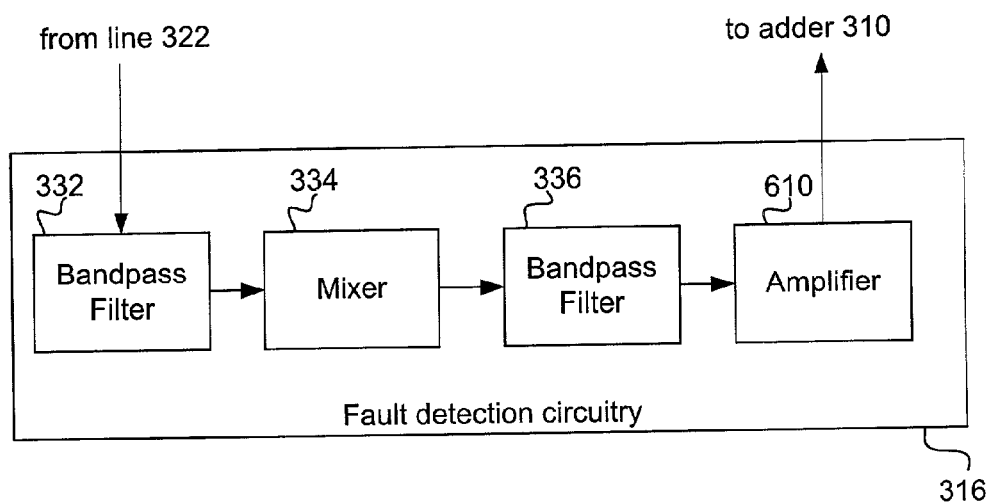
FIG. 6 illustrates another embodiment of fault detection circuitry of FIG. 3, in accordance with the invention.

FIG. 6 illustrates another embodiment of fault detection circuitry 316 of FIG. 3, including first bandpass filter 332, mixer 334, second bandpass filter 336, and an amplifier 610. In the FIG. 6 embodiment of fault detection circuitry 316, detector sequencer 338 and tone generator 340 have been replaced by amplifier 610. Amplifier 610 receives the difference tone at 60 KHz, for example, from second bandpass filter 336, amplifies the difference tone at 60 KHz, and sends the amplified difference tone at 60 KHz to LE test box 216 for detection. In this embodiment of the invention, LE test box 216 is configured to detect the amplified difference tone at 60 KHz in the presence of first tone pair 410. Likewise, LE test box 216 is configured to detect an amplified difference tone at 50 KHz in the presence of second tone pair 420, detect an amplified difference tone at 40 KHz in the presence of third tone pair 430, and detect an amplified difference tone at 30 KHz in the presence of fourth tone pair 440.

In another embodiment of the invention, fault detection circuitry 316 of loop extenders 204, 206, 208, and 210 have identically configured first bandpass filters 332, mixers 334, second bandpass filters 336, and detector/sequencers 338. For example, each fault detection circuitry 316 includes first bandpass filter 332 for passing tones in the 480–540 KHz frequency band, mixer 334 for modulating a first low tone at 480 KHz with a first high tone at 540 KHz to generate mixer signal products including a difference tone at 60 KHz, second bandpass filter 336 for passing the difference tone and attenuating other mixer signal product frequencies, and detector/sequencer 338 for sending a control signal to tone generator 340 upon detecting the difference tone for a predetermined difference tone time period, where detector/sequencer 338 is configured to detect the difference tone if the amplitude or energy of the difference tone is above a predetermined difference tone threshold level.

In addition, in this embodiment of the invention, each tone generator 340 associated with each loop extender is configured to respond to the received control signal with an unique response tone. For example, tone generator 340 of loop extender 204 responds to the received control signal with a first response tone at 60 KHz, tone generator 340 of loop extender 206 responds to the received control signal with a second response tone at 50 KHz, tone generator 340 of loop extender 208 responds to the received control signal with a third response tone at 40 KHz, and tone generator 340 of loop extender 210 responds to the received control signal with a fourth response tone at 30 KHz. Loop extenders 204, 206, 208, and 210 may be fault tested simultaneously, however, each loop extender responds with an unique tone specific to that loop extender. Simultaneous fault testing of all loop extenders may reduce fault testing time. In addition, loop extenders 204, 206, 208, and 210 may be configured to simultaneously send the 60 KHz, 50 KHz, 40 KHz, and 30 KHz response tones or, alternatively, stagger the response tones in time, such that the 60 KHz response tone is first sent to LE test box 216 via local loop 214, then the 50 KHz response tone is sent, then the 40 KHz response tone is sent, and finally the 30 KHz response tone is sent, for example.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system of fault detection in loop extenders, comprising:
   a plurality of loop extenders coupled to a local loop, each loop extender including a downstream path for amplifying downstream DSL signals and an upstream path for amplifying upstream DSL signals;
   a loop extender (LE) test box coupled to the local loop for generating tone pairs, sending the tone pairs over the local loop, receiving response tones from the local loop, and determining operational functionality of each of the plurality of loop extenders based upon the received response tones; and
   fault detection circuitry coupled to each of the plurality of loop extenders for receiving the tone pairs and generating the response tones, each response tone being associated with each loop extender.

2. The system of claim 1, wherein each tone pair is associated with one of the plurality of loop extenders.

3. The system of claim 2, wherein each tone pair includes a high tone at a high tone frequency and a low tone at a low tone frequency, each tone pair associated with a tone pair frequency band defined by the difference between the high tone frequency and the low tone frequency.

4. The system of claim 3, wherein a first tone pair associated with a first loop extender includes a first low tone at 480 KHz and a first high tone at 540 KHz.

5. The system of claim 4, wherein a first response tone associated with the first loop extender is at 60 KHz.

6. The system of claim 3, wherein a second tone pair associated with a second loop extender includes a second low tone at 380 KHz and a second high tone at 430 KHz.

7. The system of claim 6, wherein a second response tone associated with the second loop extender is at 50 KHz.

8. The system of claim 3, wherein a third tone pair associated with a third loop extender includes a third low tone at 300 KHz and a third high tone at 340 KHz.

9. The system of claim 8, wherein a third response tone associated with the third loop extender is at 40 KHz.

10. The system of claim 3, wherein a fourth tone pair associated with a fourth loop extender includes a fourth low tone at 240 KHz and a fourth high tone at 270 KHz.

11. The system of claim 10, wherein a fourth response tone associated with the fourth loop extender is at 30 KHz.

12. The system of claim 3, wherein the fault detection circuitry coupled to each loop extender generates response tones, each response tone having a response tone frequency equal to a difference of the high tone frequency and the low tone frequency associated with each loop extender.

13. The system of claim 12, wherein the LE test box determines operational functionality of each loop extender by detecting the response tone associated with each loop extender.

14. The system of claim 13, wherein the LE test box detects the response tone associated with each loop extender when the response tone associated with each loop extender exceeds a predetermined response tone threshold level.

15. The system of claim 14, wherein the predetermined response tone threshold level is a signal energy level.

16. The system of claim 14, wherein the LE test box, upon detecting a response tone associated with one of the plurality of loop extenders for a predetermined response tone time period, determines that the loop extender is operational.

17. The system of claim 14, wherein the LE test box, upon not detecting a response tone associated with one of the plurality of loop extenders for a predetermined response tone time period, determines that the loop extender is faulty.

18. The system of claim 3, wherein the fault detection circuitry for one of the plurality of loop extenders includes:
   a first bandpass filter coupled to the downstream path of the loop extender for passing the low tone and the high tone of the tone pair associated with the loop extender and attenuating signals outside of the tone pair frequency band;
   a mixer coupled to the first bandpass filter for modulating the high tone with the low tone to generate a difference tone at a difference tone frequency equal to the high tone frequency minus the low tone frequency;
   a second bandpass filter coupled to the mixer for passing the difference tone;
   a detector/sequencer coupled to the second bandpass filter for detecting the difference tone and generating a control signal; and
   a tone generator coupled to the detector/sequencer and coupled to the upstream path of the loop extender for generating a response tone associated with the loop extender upon reception of the control signal.

19. The system of claim 18, wherein the detector/sequencer detects the difference tone when the difference tone is greater than a predetermined difference tone threshold level.

20. The system of claim 19, wherein the detector/sequencer, upon detecting the difference tone for a predetermined difference tone time period, sends the control signal to the tone generator.

21. The system of claim 20, wherein the predetermined difference tone time period is 10–60 seconds.

22. The system of claim 18, wherein the LE test box detects the response tone when the response tone is greater than a predetermined response tone threshold level.

23. The system of claim 22, wherein the LE test box, upon detecting the response tone for a predetermined response time period, determines that the loop extender associated with the response tone is operational.

24. The system of claim 22, wherein the LE test box, upon not detecting the response tone for a predetermined response time period, determines that the loop extender associated with the response tone is faulty.

25. A method of fault detection in loop extenders, comprising the steps of:
generating tone pairs in a central office;
sending the tone pairs over a local loop;
receiving the tone pairs via a plurality of loop extenders coupled to the local loop;
processing the tone pairs to generate response tones, each response tone associated with one of the plurality of loop extenders;
sending the response tones over the local loop;
receiving the response tones in the central office; and
determining operational functionality of each of the plurality of loop extenders based upon the received response tones.

26. The method of claim 25, wherein each tone pair is associated with one of the plurality of loop extenders.

27. The method of claim 26, wherein each tone pair includes a high tone at a high tone frequency and a low tone at a low tone frequency, and each tone pair is associated with a tone pair frequency band defined by the difference between the high tone frequency and the low tone frequency.

28. The method of claim 27, wherein a first tone pair associated with a first loop extender includes a first low tone at 480 KHz and a first high tone at 540 KHz.

29. The method of claim 28, wherein a first response tone associated with the first loop extender is at 60 KHz.

30. The method of claim 27, wherein a second tone pair associated with a second loop extender includes a second low tone at 380 KHz and a second high tone at 430 KHz.

31. The method of claim 30, wherein a second response tone associated with the second loop extender is at 50 KHz.

32. The method of claim 27, wherein a third tone pair associated with a third loop extender includes a third low tone at 300 KHz and a third high tone at 340 KHz.

33. The method of claim 32, wherein a third response tone associated with the third loop extender is at 40 KHz.

34. The method of claim 27, wherein a fourth tone pair associated with a fourth loop extender includes a fourth low tone at 240 KHz and a fourth high tone at 270 KHz.

35. The method of claim 34, wherein a fourth response tone associated with the fourth loop extender is at 30 KHz.

36. The method of claim 27, wherein each response tone has a response tone frequency equal to a difference of the high tone frequency and the low tone frequency associated with each loop extender.

37. The method of claim 36, wherein the step of determining operational functionality of each loop extender includes detecting the response tone associated with each loop extender.

38. The method of claim 37, wherein the response tone associated with each loop extender is detected when the response tone associated with each loop extender exceeds a predetermined response tone threshold level.

39. The method of claim 38, wherein the predetermined response tone threshold level is a signal energy level.

40. The method of claim 38, wherein upon detecting a response tone associated with one of the plurality of loop extenders for a predetermined response tone time period, the loop extender is determined to be operational.

41. The method of claim 38, wherein upon not detecting a response tone associated with one of the plurality of loop extenders for a predetermined response tone time period, the loop extender is determined to be faulty.

42. The method of claim 27, wherein the step of processing the tone pairs to generate response tones includes the steps of:
passing the low tone and the high tone of a tone pair associated with the loop extender and attenuating signals outside of the tone pair frequency band;
modulating the high tone with the low tone to generate a difference tone at a difference tone frequency equal to the high tone frequency minus the low tone frequency;
passing the difference tone;
detecting the difference tone;
generating and sending a control signal upon detection of the difference tone; and
generating a response tone associated with the loop extender upon reception of the control signal.

43. The method of claim 42, wherein the step of detecting the difference tone includes detecting the difference tone when the difference tone is greater than a predetermined difference tone threshold level for a predetermined difference tone time period.

44. The method of claim 43, wherein the predetermined difference tone time period is 10–60 seconds.

45. The method of claim 42, wherein the step of determining operational functionality of each loop extender includes detecting the response tone when the response tone is greater than a predetermined response tone threshold level.

46. The method of claim 45, wherein the loop extender associated with the response tone is determined to be operational when the response tone is detected for a predetermined response tone time period.

47. The method of claim 45, wherein the loop extender associated with the response tone is determined to be faulty when the response tone is not detected for a predetermined response tone time period.

48. A system of fault detection in loop extenders, comprising:
means for generating tone pairs in a central office;
means for sending the tone pairs over a local loop;
means for receiving the tone pairs via a plurality of loop extenders coupled to the local loop;
means for processing the tone pairs to generate response tones, each response tone associated with one of the plurality of loop extenders;
means for sending the response tones over the local loop;
means for receiving the response tones in the central office; and
means for determining operational functionality of each of the plurality of loop extenders based upon the received response tones.

* * * * *